INVENTOR
Ange Emile VOISINE
By Pierre Lespérance
AGENT

Feb. 27, 1962  A. E. VOISINE  3,022,752
BAKING OVEN
Filed Nov. 8, 1960  3 Sheets-Sheet 2

INVENTOR
Ange Emile VOISINE

By

AGENT

Feb. 27, 1962     A. E. VOISINE     3,022,752
BAKING OVEN

Filed Nov. 8, 1960     3 Sheets-Sheet 3

INVENTOR
Ange Emile VOISINE
By Pierre Lespérance

AGENT

United States Patent Office 3,022,752
Patented Feb. 27, 1962

3,022,752
BAKING OVEN
Ange Emile Voisine, Rue de la Gare, Saint Charles de Bellechasse, Quebec, Canada
Filed Nov. 8, 1960, Ser. No. 67,949
Claims priority, application Canada July 23, 1960
6 Claims. (Cl. 107—63)

The present invention relates to an oven for baking bread, pastries, and the like, and more particularly to an industrial baking oven such as used in bakeries.

The general object of the present invention resides in the provision of an oven of the character described provided with an improved system for distributing the heat in order to obtain uniform baking.

Another object of the present invention resides in the provision of an oven of the character described, in which the duct system for the hot combusion gases form baffles and have an increased heat exchange area in order to utilize the heat with a maximum efficiency and thereby in a very economical manner.

Another object of the present invention resides in the provision of an oven of the character described which is relatively simple and inexpensive to construct.

Another object of the present invention resides in the provision, in an oven of the character described, of means for regulating and obtaining equal distribution of the hot combustion gas flow on each side of the oven.

The foregoing and other important objects of the present invention will become more apparent during the following disclosure, and by referring to the drawings, in which.

Figure 1:
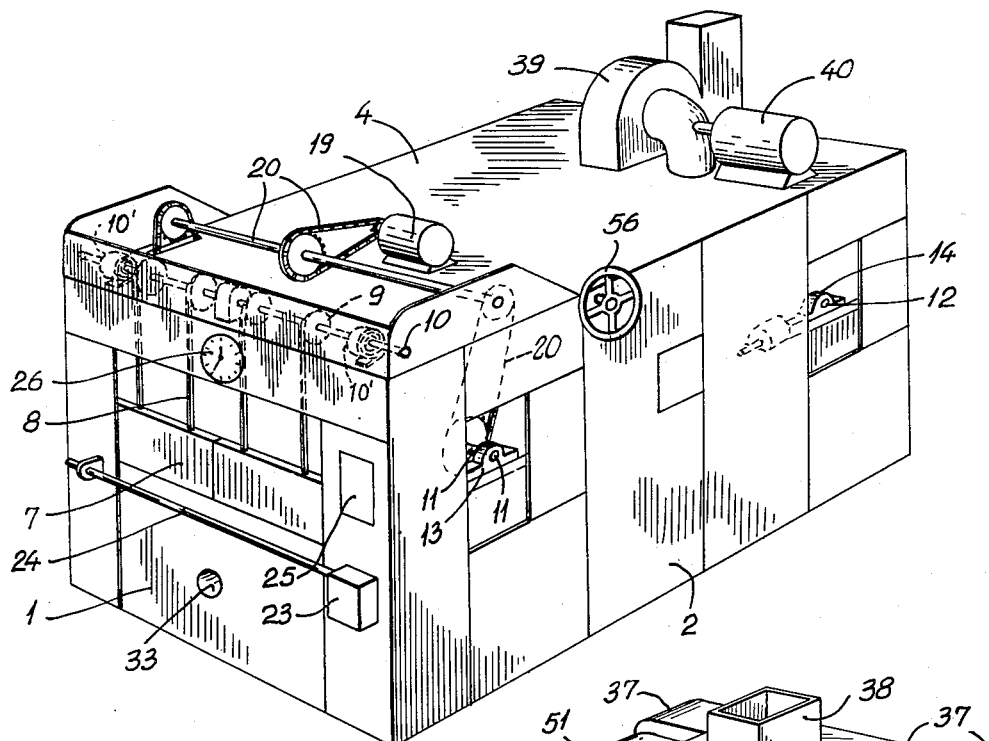
FIGURE 1 is a perspective view of the baking oven of the present invention.

Referring now more particularly to the drawings in which like reference characters indicate like elements throughout, the oven of the present invention consists generally in a rectangular heat insulated enclosure comprising a front wall 1, lateral walls 2, a back wall 3 and a top wall 4. All these walls are of double thickness with thermal insulation 5. Front wall 1 is provided with an access opening 6 which can be closed by two vertically sliding doors 7 suspended by chains 8 meshing with gear wheels 9 secured on a transverse shaft 10 mounted on the top wall 4. Doors 7 are counterbalanced either by counterweights or by spiral springs acting on shaft 10 as indicated at 10'.

Transverse shafts are disposed in the interior of the oven, namely, front shaft 11 and back shaft 12 which are mounted on front bearings 13 and adjustable back bearings 14 respectively said bearings being accessible from the exterior by removing panels from the lateral walls 2 as illustrated in FIGURE 1.

Sprocket wheels 15 and 16 are secured to shafts 11 and 12 respectively on each side of the interior of the oven and endless sprocket chains 17 are trained on said sprocket wheels 15 and 16. A series of shelves 18 are suspended from the sprocket chains 17 and are equally spaced along chains 17 and serve to receive the bread loaves or other food for baking.

Front shaft 11 is actuated by an electric motor 19, mounted on top wall 4, by the intermediary of a transmission system 20. The upper row of shelves 18 move from front to back of the oven and during their horizontal movement, the shelves are prevented from tilting because they are provided at their sides with lugs 21 which slide along guiding rails 22 secured to the inside of the lateral walls 2 of the oven.

The shelves 18 successively come opposite access opening 6 whereby the baked loaves of bread or the like can be removed while fresh loaves can be placed on the same shelf for baking. Motor 19 is controlled by a reversible switch mounted in a box 23 secured to the front of the oven and this switch is controlled by a transverse rod 24 which can be displaced to and fro whereby the shelves 18 can be moved forwardly or rearwardly during charging and discharging of the oven. During baking, the shelves 18 are stationary, the motor 19 being stopped.

Front wall 1 is also provided with a panel 25 including a thermometer for indicating the temperature inside the oven and switches for lights inside the oven. A clock 26 is also mounted in front of the oven and can control the duration of baking.

During baking, shelf 18 remains stationary and it is therefore essential to obtain equal and uniform distribution of the heat to obtain uniform baking of the bread loaves or other food.

In accordance with the present invention, there is provided an improved duct system for the hot combustion gases and which utilises the heat with maximum efficiency and makes possible substantial savings in fuel. This duct system comprises a lower level illustrated in FIGURE 5, an intermediate level illustrated in FIGURE 6, and a top level illustrated in FIGURE 7, the entire duct system being shown in perspective view in FIGURE 2, and in side elevation in FIGURE 4. The entire duct system is substantially symmetrical with respect to the central vertical plane of the oven.

The lower level is generally indicated at 27 and comprises a central duct 28 of generally rectangular section and disposed longitudinally at the bottom of the oven. This central duct 28 is opened at the back of the oven for receiving a fuel oil burner 29 or any other type of flame producing equipment which projects the flame towards the front of the oven. The rear part of duct 28 is lined with a refractory lining 30 for forming a combustion chamber. A V-shaped shield 31 closes the front end of duct 28 for laterally deflecting the hot gases and directing the same through lateral apertures 32 made in the sides of duct 28.

An inspection tube 33 for looking at the flame to ascertain the proper functioning of the burner 29, especially when the latter is started, opens at the apex of V-shaped shield 31 and at the exterior of the front wall 1 of the oven. Tube 33 avoids the necessity of walking to the back of the oven to inspect the functioning of the burner.

Figure 5:
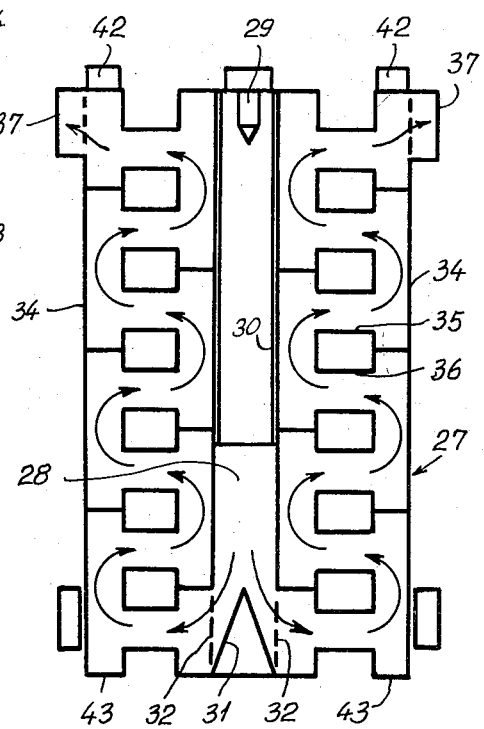
FIGURE 5 is a schematic plan view of the section taken along line 5—5 of FIGURE 4.

On each side of duct 28 and secured to the latter is disposed a lateral duct 39 co-extensive with central duct 28 and provided with rectangular openings 35 forming vertical ducts in communication with the inside of the oven at the top and bottom of lateral ducts 34 for circulation of the air within the oven. These rectangular ducts 35 do not communicate with the inside of the lateral ducts 34 and their walls 36 form baffles as illustrated in FIGURE 5. These baffles considerably lengthen the travel of the hot gases within ducts 34 as indicated by the arrows in FIGURE 5. Thus, the ducts 34 form a very large heat exchange area. The hot combustion gases are directed towards the back of the oven within ducts 34 and enter vertical passages 37 on each side of the oven, which are themselves disposed within the insulation 5 in the lateral walls 2 and are bent towards the center of the oven at the top level within the insulation of the top wall 4 in order to communicate with the central outlet 38 which communicates with the exhaust side of a blower 39 actuated by an electric motor 40 by means of an adjustable transmission, the blower 39 and motor 40 being mounted on the top wall 4 of the oven. Thus, the now considerably cooled gases are forcibly ejected into a chimney or stack (not shown).

Figure 2:
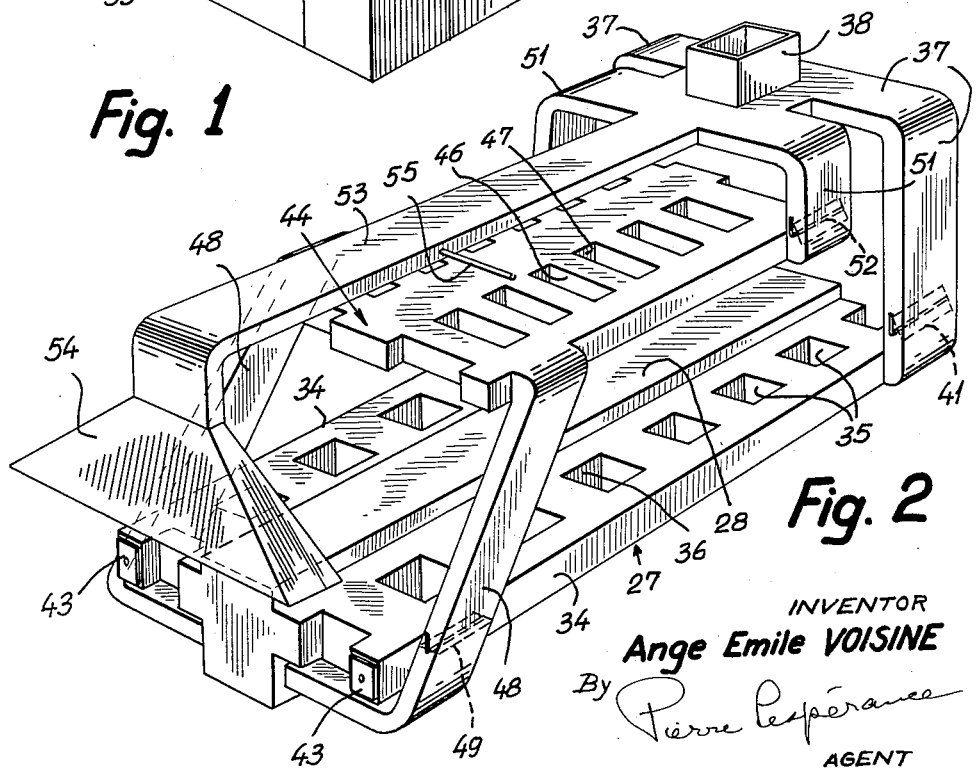
FIGURE 2 is a perspective view of the duct system for the hot combustion gases.

Each vertical passage 37 on each side of the oven is provided with an adjustable damper 41 illustrated in FIGURE 2, for regulating the flow of the hot gases in order to obtain equal flow on each side of the oven. Moreover, the back end of each lateral duct 34 is provided adjacent the burner with an automatically damped air intake 42 which enables the equalization of the pressure within ducts 34 on each side of the oven. Moreover, the ducts 34 have at the front end thereof safety doors 43.

Figure 3:
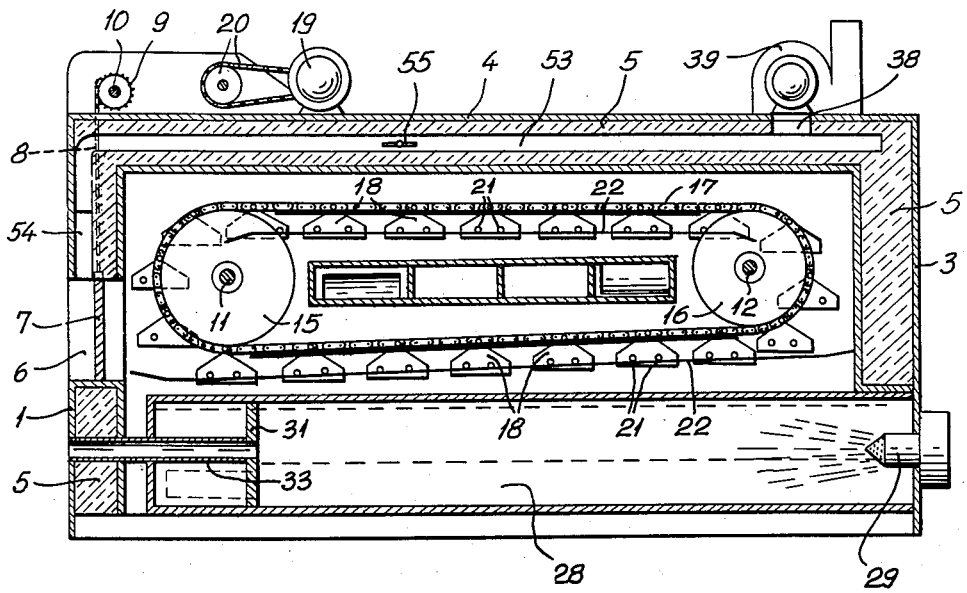
FIGURE 3 is a longitudinal section of the oven.
Figure 4:
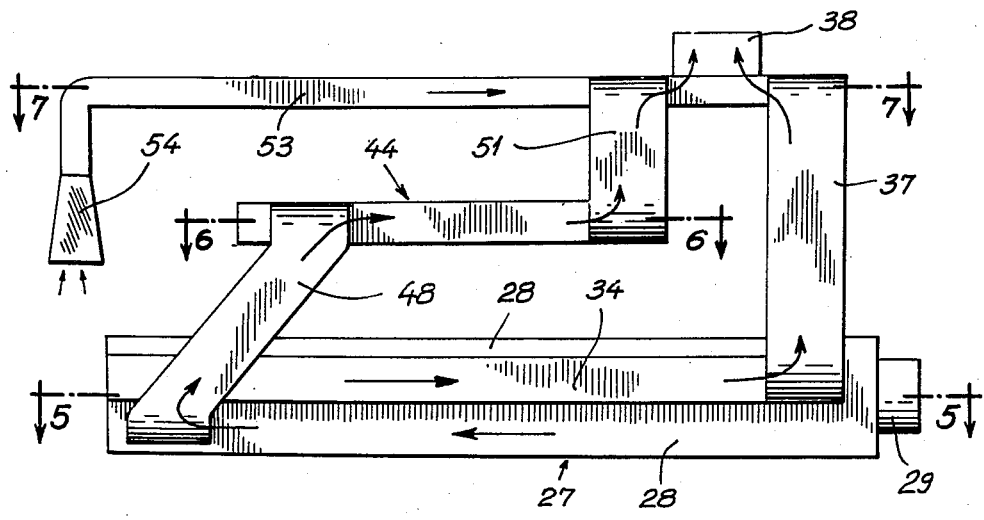
FIGURE 4 is a side elevation of the duct system for the combustion gases.
Figure 6:
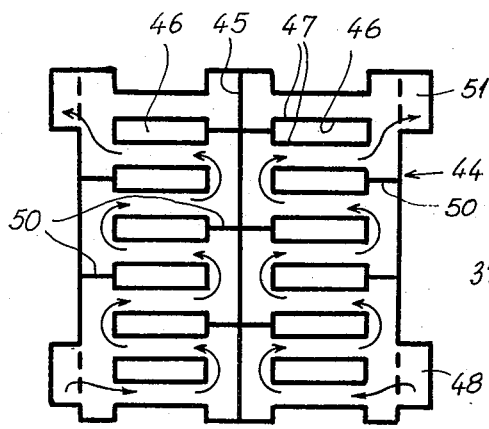
FIGURE 6 is a schematic plan view of the section taken along line 6—6 of FIGURE 4.
Figure 7:
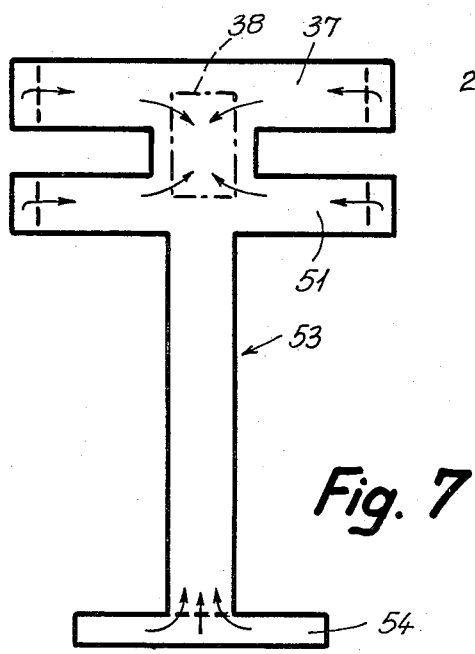
FIGURE 7 is a schematic plan view of the section taken along line 7—7 of FIGURE 4.

The intermediate level of the hot combustion gases duct system is generally indicated at 44 and is illustrated in FIGURES 2, 4 and 6. This intermediate level is disposed between the two superposed rows of shelves 18 and between the front and back sprocket wheels 15 and 16 respectively as shown in FIGURE 3. This intermediate level comprises a box like structure of generally rectangular shape having therein a longitudinal central partition 45 dividing the box structure in two symmetrical lateral portions, each lateral portion being provided with a series of openings 46 of rectangular section for the free circulation of the oven air through said openings and the heating of said oven air. These openings are closed from the inside of the box structure by lateral walls 47. The hot gases enter the box structure 44 at the front side portions thereof through inclined ducts 48 which are disposed within the insulation 5 of the lateral walls 2 of the oven and the lower ends of which are bent inwardly towards the center of the oven and are in direct communication with the front part of the central duct 28 of the lower level 27 below lateral ducts 34. As illustrated in FIGURE 2, the inclined ducts 48 are each provided with a variable damper 49 to equalize the rate of flow of the gases on each side of the oven. The hot gases circulate within the intermediate level 44 in accordance with the arrows indicated in FIGURE 6 due to the presence of the baffles formed by walls 47 of openings 46 and by the walls 50.

The hot combustion gases leave the intermediate level 44 at the back of the latter through vertical ducts 51 provided with dampers 52 and which communicate with the upper level and eventually with the outlet 38.

The upper level is generally indicated at 53 and comprises a central longitudinally extending duct running within the insulation 5 of the top wall 4 of the oven, this central duct being bent downwardly at the front of the oven to form an inverted funnel 54, and being in communcation with the outlet 38 at the back of the oven. The funnel 54 opens just above the access opening 6 and forwardly of the doors 7, as illustrated in FIGURE 3, in order to suck the hot air when the doors 7 are opened. The duct 53 is provided with a damping valve 55 for the control of exhaust by funnel 54. This valve 55 is controlled by a wheel 56 externally of the oven, as shown in FIGURE 1. All the valves or dampers 41, 49 and 52 are actuated from the exterior of the oven by any suitable means (not shown).

From the foregoing, it is clear that the duct system in accordance with the present invention for the hot combustion gases uniformly and equally distribute the heat within the interior of the oven and also effects a great saving in heat because the system constitutes an excellent heat exchanger.

While a preferred embodiment in accordance with the present invention has been illustrated and described, it is understood that various modifications may be resorted to without departing from the spirit and scope of the appended claims.

What I claim is:

1. In a baking oven, in combination, a conveyor system having substantially horizontal superposed upper and lower runs, food supporting shelves suspended from said conveyor system for movement by said system, a heating arrangement for said oven comprising a lower level of ducts disposed within the oven and underneath the conveyor system and shelves, an intermediate level of ducts disposed between the upper and lower runs of said conveyor system and shelves, and an upper level of ducts disposed above said conveyor system and having an outlet, said lower and intermediate levels of ducts being provided with vertical passages made in said ducts out of communication with the interior thereof for free air circulation of the air in the oven through said vertical passages, the walls of said vertical passages defining baffles in the interior of said ducts, means for feeding hot combustion gases to said ducts, means for establishing communication of the various levels of said ducts and exhaust means at the outlet of the upper level of ducts for exhausting said hot gases through said ducts, said lower level of ducts consisting of a central longitudinally extending duct in the median plane of the oven and of two lateral ducts on each side of said central duct, and co-extensive therewith and provided with said vertical passages, said lateral ducts being in communcation with said central duct at the front of the oven and in communication at the back of the oven with vertical conduits themselves in communication with the upper level of ducts, said means for feeding said ducts with hot combustion gases comprising a burner for emitting a flame within said central duct at the back of the oven.

2. In an oven as claimed in claim 1, wherein said intermediate level of ducts comprises a substantially flat box like structure divided into two lateral symmetrical portions by a central longitudinally extending partition, each lateral portion being provided with said vertical passages, and conduits directly connecting the front part of the central duct of the lower level with the front part of said two symmetrical portions of said intermediate level of ducts and additional conduits directly connecting the back part of said two symmetrical portions with the upper level of ducts.

3. In an oven as claimed in claim 1, wherein said upper level of ducts comprises a central duct longitudinally extending within the oven from front to back, and in communication with said exhaust means at the back of the oven and provided with a communicating inverted funnel located in front of the oven and disposed above and in front of the access door for the oven.

4. In an oven as claimed in claim 2, wherein said conduits are provided with adjustable valves on each side of the oven for controlling the flow of hot gases within the levels of ducts.

5. In an oven as claimed in claim 1, wherein the front end of the central duct of the lower level is provided with a V-shaped shield for laterally deflecting the hot combustion gases into said lateral ducts of said lower level.

6. In an oven as claimed in claim 3, wherein said central duct of the upper level is provided with an adjustable valve for adjusting the exhaust through said funnel.

References Cited in the file of this patent

UNITED STATES PATENTS

| | | |
|---|---|---|
| 1,852,526 | Kemp | Apr. 5, 1932 |
| 1,999,503 | Houlis | Apr. 30, 1955 |
| 2,762,321 | Cook | Sept. 11, 1956 |

FOREIGN PATENTS

| | | |
|---|---|---|
| 229,981 | Great Britain | Mar. 5, 1925 |